(12) United States Patent
Thomas et al.

(10) Patent No.: US 6,659,218 B2
(45) Date of Patent: Dec. 9, 2003

(54) STEERING SYSTEM

(75) Inventors: Steven M Thomas, Saginaw, MI (US); James Myrl Card, South Linwood Beach, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/100,964

(22) Filed: Mar. 18, 2002

(65) Prior Publication Data

US 2003/0183440 A1 Oct. 2, 2003

(51) Int. Cl.$^7$ .............................. B62D 5/04; B62D 1/99
(52) U.S. Cl. .................... 180/402; 180/419; 180/421
(58) Field of Search ................... 180/402, 403, 180/405, 406, 419, 421, 287, 78, 74; 701/42, 43; 280/777, 775

(56) References Cited

U.S. PATENT DOCUMENTS

| | | | |
|---|---|---|---|
| 5,137,128 A | * 8/1992 | Takei et al. ................. 192/21.5 |
| 5,598,908 A | 2/1997 | York et al. |
| 5,602,735 A | 2/1997 | Wada |
| 5,718,131 A | * 2/1998 | Bobbitt, III ................. 70/184 |
| 5,732,791 A | * 3/1998 | Pinkos et al. ............... 180/444 |
| 5,787,759 A | 8/1998 | Olgren |
| 5,823,309 A | * 10/1998 | Gopalswamy et al. ..... 192/21.5 |
| 5,848,753 A | * 12/1998 | Bansbach ................... 192/21.5 |
| 5,906,120 A | * 5/1999 | Thacker et al. .............. 70/186 |
| 6,035,739 A | 3/2000 | Milton |
| 6,053,067 A | * 4/2000 | Garnault et al. .............. 74/492 |
| 6,138,788 A | * 10/2000 | Bohner et al. .............. 180/405 |
| 6,318,531 B1 | 11/2001 | Usoro et al. |
| 6,354,626 B1 | * 3/2002 | Cartwright ................... 280/777 |
| 6,389,343 B1 | * 5/2002 | Hefner et al. ................. 701/41 |
| 6,442,462 B1 | * 8/2002 | Nishizaki et al. ............. 701/41 |

OTHER PUBLICATIONS

Park et al., Steer–by–wire using semi–active actuator, Jan. 22, 2002, Pub. No. US 2002/0108804 A1.*
Werner Harter et al, Future Electrical Steering Systems: Realizations with Safety Requirements, SAE Technical Papers Series, Mar. 6–9, 2000, pp 1–9.
Dr. Christian Ebner, Steer–by–Wire, A rough outline of ongoing thoughts, BMW Technik, May 2000, pp1–13.

* cited by examiner

*Primary Examiner*—Lesley D. Morris
*Assistant Examiner*—Tony Winner
(74) *Attorney, Agent, or Firm*—Michael D. Smith

(57) ABSTRACT

A steering system comprises a hand wheel positioned for manipulation by a driver, a steering shaft extending from the hand wheel, and a magnetic column lock. The steering shaft is supported by a steering column housing so that it can rotate on its own axis. The magnetic column lock includes a rotor attached to steering shaft, a stator attached to column housing, and magnetorheological fluid filling a space between the rotor and stator. In another aspect of the steering system, the steering shaft extends from the hand wheel through a hand wheel actuator having a position sensor and a motor for providing driver feedback. A steering column extends from a lower portion of said steering shaft to a rack, and includes a pinion at its lower end for engagement with the rack, so that the rack translates left and right when the pinion is rotated in corresponding directions. The rack is connected to the front road wheels and causes the front road wheels to steer when it is translated. An electronic controller receives signals indicative of an angular position of the hand wheel from the position sensor, and a road wheel actuator connected to the steering rack receives signals from the electronic controller and repositions the steering rack in response to the signals from said electronic controller. A magnetic clutch having MR fluid is provided for selectively engaging said steering shaft to said steering column.

9 Claims, 2 Drawing Sheets

STEERING SYSTEM

TECHNICAL FIELD

This invention relates to steering systems for vehicles. More particularly, this invention relates to a mechanical back-up system for a steer-by-wire system for vehicles and a security system therefor.

BACKGROUND

Automobiles are conventionally equipped with a pair of front road wheels that are steered to enable the vehicle to turn left and right as it maneuvers on land. It is also known to provide actuators for steering rear wheels in automobiles. In the past, vehicle steering systems commonly employed a mechanical connection between the driver-operated hand wheel and the front road wheels of an automotive vehicle. As the driver rotated the hand wheel, a mechanical linkage through the vehicle's tie-rods actuated the road wheels sometimes with the assistance of a power assist steering motor or hydraulic piston.

Recently, steer-by-wire steering systems have been introduced into automotive vehicles to provide road wheel steering function. Included in a typical steer-by-wire steering system is a hand wheel actuator for monitoring the angular position of the steering wheel, and road wheel motor actuators which are controlled by controllers in response to tracking the sensed angular displacement of the hand wheel from a central position. In contrast to prior steering systems, the steer-by-wire steering system does not employ a mechanical linkage between the steering wheel and the individual road wheels. Exemplary of such known steer-by-wire systems is commonly-assigned U.S. Pat. No. 6,176,341, issued Jan. 23, 20001 to Ansari. Other proposed systems are described in "Future Electrical Steering Systems: Realizations with Safety Requirements" by Harter, et al. and "Steer-by-Wire" by Ebner.

Because there is no mechanical linkage between the hand wheel and road wheels in a steer-by-wire system, steering enhancements such as variable-ratio steering and oversteer/understeer correction are easily implemented to improve the drivability and safety of the vehicle. At the same time, mechanical back-up systems are known to engage a traditional mechanical steering linkage in the event of a failure of the electronic steer-by-wire system. See, for example, "Steer-by-Wire" by Dr. Christian Ebner, for a typical example of such a system, which includes a hand wheel actuator having a steering shaft, and a steering column selectively engaging the shaft via a clutch, which is electrically actuated. It would be desirable to provide a steer-by-wire system with a mechanical back-up device that does not require moving parts to engage, thereby improving overall reliability.

At the same time, mechanical column locks, used as a theft deterrent and to prevent the steering wheel from turning as an aid when exiting and entering the vehicle (thereby providing a grab-handle) presents the problem in that its convenient location presents thieves with the opportunity to disable it, and adds undesirable weight at the top of the steering column. Extra weight near the top of the steering column requires a strong support and presents safety issues during a frontal collision.

SUMMARY

The above-discussed and other drawbacks and deficiencies of the prior art are overcome or alleviated by a steering system comprising a hand wheel positioned for manipulation by a driver and a steering shaft, extending from the hand wheel and a magnetic column lock. The steering shaft is supported by a steering column housing so that it can rotate on its own axis. The magnetic column lock includes a rotor attached to steering shaft, a stator attached to column housing, and magnetorheological fluid filling a space between the rotor and stator.

In another aspect of the steering system, the steering shaft extends from the hand wheel through a hand wheel actuator having a position sensor and a motor for providing driver feedback. A steering column extends from a lower portion of said steering shaft to a rack, and includes a pinion at its lower end for engagement with the rack, so that the rack translates left and right when the pinion is rotated in corresponding directions. The rack is connected to the front road wheels and causes the front road wheels to steer when it is translated. An electronic controller receives signals indicative of an angular position of the hand wheel from the position sensor, and a road wheel actuator connected to the steering rack receives signals from the electronic controller and repositions the steering rack in response to the signals from said electronic controller. A magnetic clutch having MR fluid is provided for selectively engaging said steering shaft to said steering column.

The above-discussed and other features and advantages of the present invention will be appreciated and understood by those skilled in the art from the following detailed description and drawings.

BRIEF DESCRIPTION OF THE DRAWINGS

The present invention will now be described by way of example with reference to the accompanying drawings, in which.

DETAILED DESCRIPTION OF THE PREFERRED EMBODIMENTS

Figure 1:
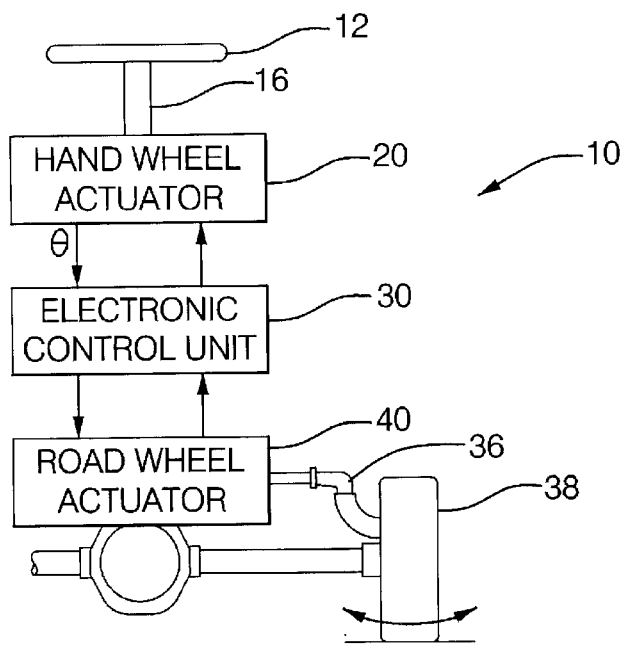
FIG. 1 shows a schematic overview of a steer-by-wire system.
Figure 2:
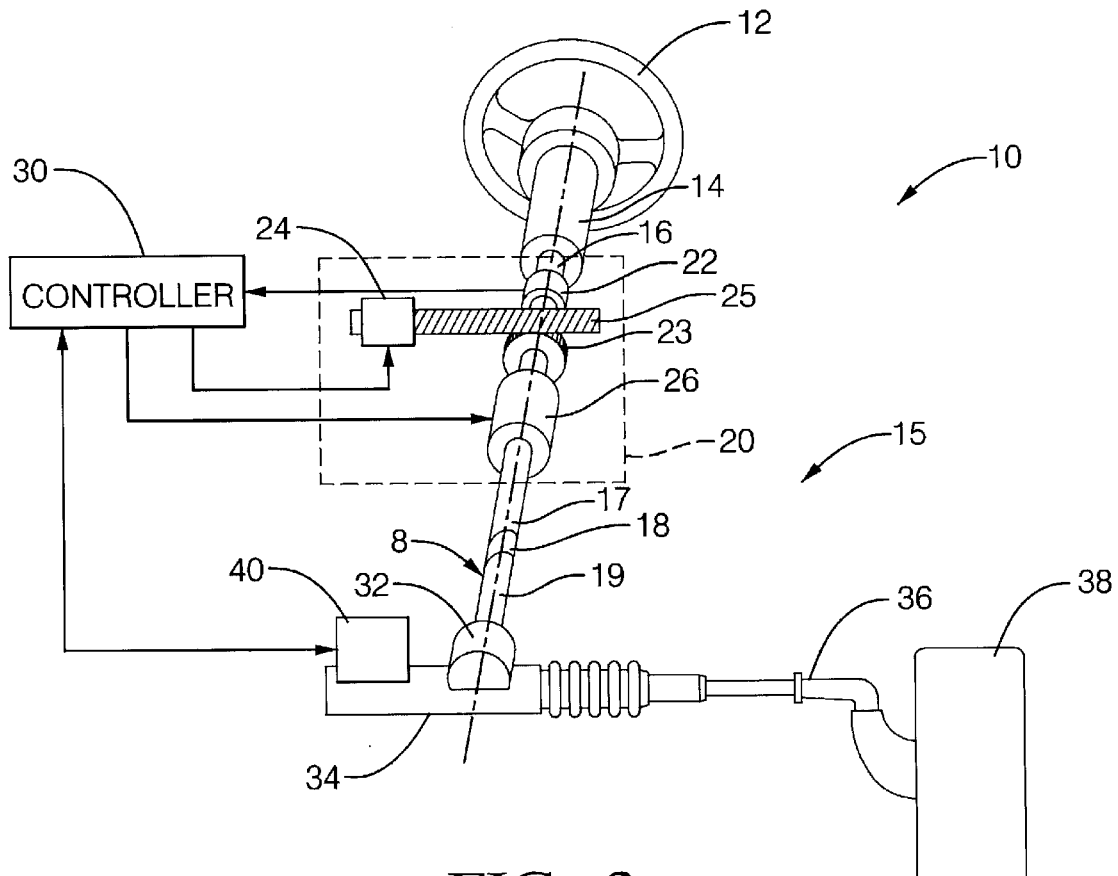
FIG. 2 shows a simplified overview of a steer-by-wire system having a mechanical backup.

Referring now to FIGS. 1 and 2, a schematic overview of an exemplary steering system 10 having a mechanical back-up system will now be described. Driver input is made to hand wheel 12, which is connected by steering shaft 16 to hand wheel actuator 20. Hand wheel actuator 20 includes a position sensor 22 for detecting the angular displacement of hand wheel 12. Multiple position sensors may be provided for redundancy. A signal indicative of the angular displacement of hand wheel 12 is generated by position sensor 22 and directed to electronic controller 30, which includes a microprocessor and other assorted electronic components well known in the field of electronic control for providing memory, input/output, and processing functions. Electronic controller 30 receives signals from the hand wheel position sensor(s) 22 in hand wheel actuator 20 and determines what signals, if any, to send to road wheel actuator 40 so that the position of road wheels 38 (only one shown) correspond with the position of hand wheel 12. Road wheel actuator 40 controls the steering position of road wheels 38 by generating linear motion of a rack assembly within rack housing 34 by means of a ball-screw and ball-nut configuration as is known in the art, the rack then causing rotation of wheels 38 (only one shown) via tie-rods 36 (only one shown).

Road wheel actuator 40 includes torque or strain sensors (not shown) to measure force required by road wheel actuator 40 to rotate and maintain road wheels 38 in their desired position. Output from road wheel torque sensors (not shown) is transmitted to electronic controller 30, which then transmits driver feedback information to hand wheel actuator 20. Hand wheel actuator 20 includes an electric motor 24 or other actuator to provide force-feedback to steering wheel 12, thus giving the driver tactile feedback as to the road conditions. Motor 24 includes a worm 25 that rotates a worm gear 23 fixed to steering shaft 16. Hand wheel actuator 20 may also include a torque sensor (not shown) for providing a signal to the electronic control unit to ensure that the driver is receiving the correct amount of driver feedback.

In the event of a failure sensed by controller 30 of any critical component of steering system 10, controller 30 sends a signal to clutch 26 engaging the mechanical back-up system 15. The back-up system 15 comprises a steering column 8 that includes at least an upper shaft 17 and lower shaft 19 coupled by a universal joint 18 to allow for relative movement between lower shaft 19 and hand wheel 12. A pinion within pinion housing 32 fixed to the lower end of lower shaft 19 engages a rack within rack housing 34. Rotation of lower shaft 19 causes rotation of the pinion and linear movement of rack within rack housing 34. Connected on either end of the rack are tie rods 36 (only one shown) which control the steering rotation of road wheels 38.

Figure 3:
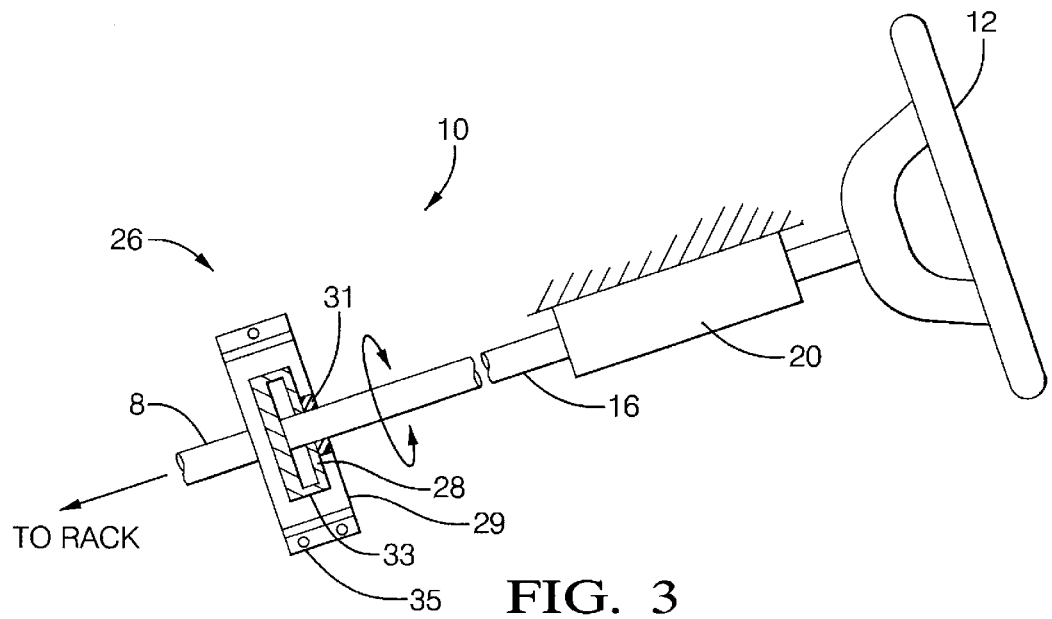
FIG. 3 shows another aspect of a steer-by-wire system having a mechanical backup.

FIG. 3 is another view of steering system 10 with an exaggerated view of clutch 26. Clutch 26 is a type that utilizes magnetorheological (MR) fluid and therefore has only two moving parts, a rotor 28 and stator 29. A seal 31 contains MR fluid 33 between the rotor 28 and stator 29 of clutch 26. MR fluid typically comprises a random dispersion of magnetizable particles suspended in a base carrier liquid such as mineral oil, synthetic hydrocarbon, water, silicone oil, esterified fatty acid, or some other suitable organic liquid. A silica compound is typically added to the suspension to impart thixotropic properties to the suspension, thereby preventing the magnetic particles from precipitating out of the suspension. The particles are of a characteristic hardness and are generally microspheric in structure. The particles may be carbonyl iron particles having a surfactant chemically bonded onto the surface thereof. Other types of particles that may be used for the MR fluid include, but are not limited to, nickel, cobalt, and alloys thereof.

Under normal conditions, MR fluid 33 exhibits the properties of a liquid having a relatively low viscosity, therefore allowing steering shaft 16 and steering column 8 to turn freely with respect to one another. However, when subject to magnetization, MR fluid 33 is altered such that the microspheric particles dispersed therein align to form fibrous structures and the MR fluid exhibits Bingham plastic rheological behavior. In Bingham plastic rheological behavior, a linear relationship is maintained between the shear stress of the fluid and the shear rate of the fluid, as in Newtonian flow; however, in Bingham plastic rheological behavior, a finite shear stress is required to initiate the flow. In such a s state, the shear stress of the MR fluid is equal to the yield stress of the MR fluid plus the product of the viscosity of the MR fluid and the shear rate of the MR fluid. The yield stress is controlled by the application of a magnetic field to the MR fluid. Upon being subject to a shear rate under the influence of a magnetic field, the change from the random nature of the dispersion of the microspheric particles to the fibrous structures of the aligned microspheric particles provides increased viscosity. Therefore, the electromagnetic nature of the MR fluid allows for selective and variably actuable control of the shear stress sustainable by the MR fluid. MR fluids are described in detail by Foister in U.S. Pat. No. 5,667,715, which is entitled, "Magnetorheological Fluids" and is incorporated herein by reference.

When controller 30 (FIGS. 1, 2) senses a malfunction in a critical component, it powers electromagnet 35 which places MR fluid 33 in a magnetic field, causing the fluid to convert from a liquid to a Bingham plastic, essentially locking rotor 33 and stator 29 so that they turn as one, thereby linking steering shaft 16 with steering column 8. Thus, when electromagnet 35 is powered, hand wheel 12 is connected mechanically to road wheels 38 via clutch 26 as previously described. Magnet 35 provides sufficient magnetic field to cause the break-down torque to be sufficiently high so that it can sustain the torque required to manually steer the vehicle under emergency circumstances.

Figure 4:
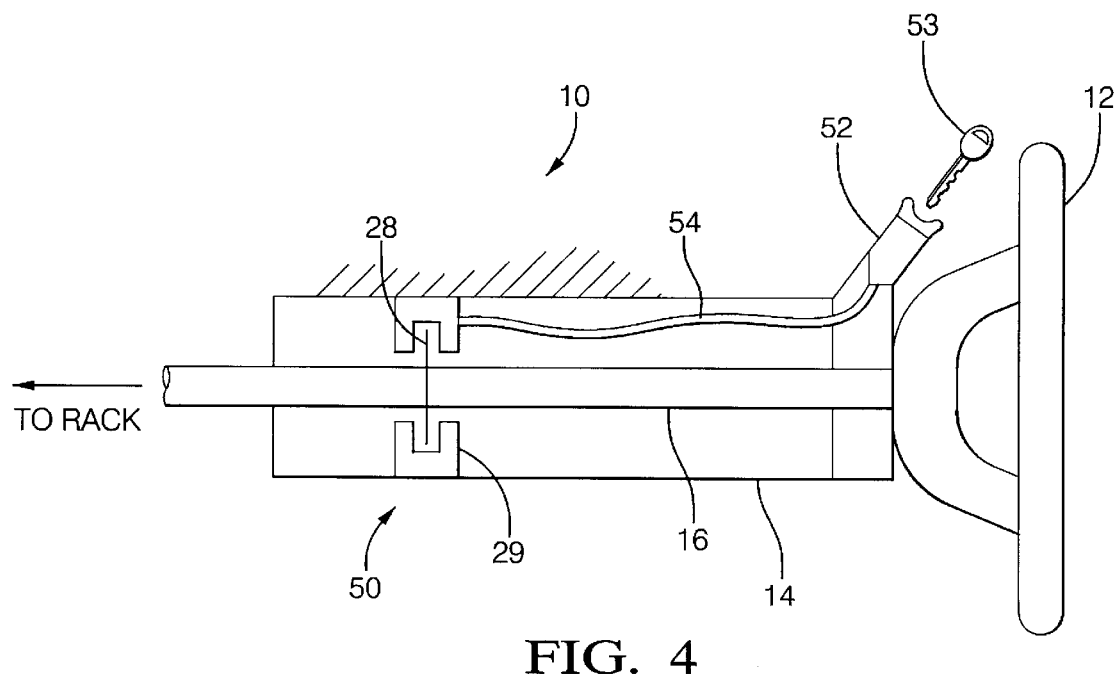
FIG. 4 shows an aspect of a theft-deterrent system.

FIG. 4 shows a steering column housing 14 having an MR fluid column lock 50 positioned remotely from ignition switch 52. Column lock 50 operates in a manner similar to clutch 26 described above with respect to FIG. 3, except that the stator 29 is fixed to the column housing and includes an electromagnet (not shown) therein. Upon removal of key 53 from ignition switch 52, column lock 50 is activated substantially preventing steering shaft 16 from rotating and thereby locking hand wheel 12 in place. A control unit (not shown) for engaging and disengaging column lock 50 may be located at the column lock, at the ignition switch, or remotely. Thus, a direct connection 54 from ignition switch 42 to column lock 50 is not required.

Key 53 may include a microchip or other security device that is detected and authenticated by the control system (not shown) prior to releasing column lock 50. Such electronic key security measures are known in the field of automotive security and need not be explained herein in detail. In addition to providing increased security, column lock 50 maintains hand wheel 12 in a fixed position thereby allowing its use as a reliable grab-handle during entry and exit of the vehicle.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A steering system comprising:
   a hand wheel positioned for manipulation by a driver;
   a steering shaft extending from the hand wheel, the steering shaft being supported by a steering column housing so that it can rotate on its own axis; and
   a magnetic column lock including a rotor attached to the steering shaft, a stator fixedly attached to the column housing and including an electromagnet, and magnetorheological fluid filling a space between said rotor and stator; wherein, when the electromagnet is powered, the rotor is locked with respect to the stator and the steering shaft is prevented from rotating.

2. The steering system of claim 1 wherein:
   said steering shaft extends through a hand wheel actuator having a position sensor;
   said steering system further comprises an electronic controller receiving signals indicative of an angular displacement of the hand wheel from said position sensor; and a magnetic clutch having MR fluid for selectively engaging said steering shaft to said steering column;

wherein said magnetic clutch is engaged when said electronic controller senses a fault in said steering system.

3. A steering system comprising:

a hand wheel positioned for manipulation by a driver;

a steering shaft extending from the hand wheel, the steering shaft being supported be a steering column housing so that it can rotate on its own axis;

a magnetic column lock including a rotor attached to steering shaft (16), a stator attached to column housing, and magnetorheological fluid filling a space between said rotor and stator; and, an ignition switch whereby said column lock is engaged and prevents said steering shaft from rotating upon removal of an ignition key from said ignition switch.

4. The steering system of claim 3 wherein said magnetic column lock is positioned remotely from said ignition switch.

5. A steering system comprising:

a hand wheel positioned for manipulation by a driver;

a steering shaft extending from the hand wheel, the steering shaft being supported by a steering column housing so that it can rotate on its own axis;

a magnetic column lock including a rotor attached to steering shaft (16), a stator attached to column housing, and magnetorheological fluid filling a space between said rotor and stator; and, a steering column extending from a lower portion of said steering shaft to a rack, said steering column having a pinion at its lower end for engagement with said rack, causing said rack to translate left and right when said pinion is rotated in corresponding directions, said rack being connected to front road wheels and causes the front road wheels to steer when translated.

6. The steering system of claim 5 wherein:

said steering shaft extends through a hand wheel actuator having a position sensor and a motor for providing driver feedback;

said steering system further comprises an electronic controller receiving signals indicative of an angular displacement of the hand wheel from said position sensor;

a road wheel actuator connected to a steering rack, the road wheel actuator receiving signals from said electronic controller and repositioning said steering rack in response to said signals from said electronic controller; and a magnetic clutch having MR fluid for selectively engaging said steering shaft to said steering column.

7. The steering system of claim 6 wherein said magnetic clutch is engaged when said electronic controller senses a fault in said steering system.

8. The steering system of claim 6 wherein said magnetic clutch comprises a rotor connected to one of said steering shaft and said steering column, a stator connected to another of said steering shaft and said steering column, said MR fluid being disposed between said rotor and said stator; said clutch further comprising an electromagnet disposed in proximity to said rotor and said stator such that when energized, said electromagnet generates a magnetic field that passes through said MR fluid, causing said MR fluid to exhibit Bingham plastic properties.

9. The steering system of claim 5 further comprising a control unit for engaging and disengaging the magnetic column lock.

* * * * *